US011889288B2

(12) United States Patent
Carlsson et al.

(10) Patent No.: US 11,889,288 B2
(45) Date of Patent: Jan. 30, 2024

(54) USING ENTERTAINMENT SYSTEM REMOTE COMMANDER FOR AUDIO SYSTEM CALIBRATION

(71) Applicant: Sony Corporation, Tokyo (JP)

(72) Inventors: Gregory Carlsson, Santee, CA (US); James R. Milne, Ramona, CA (US); Marvin DeMerchant, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 175 days.

(21) Appl. No.: 16/943,938

(22) Filed: Jul. 30, 2020

(65) Prior Publication Data

US 2022/0038836 A1 Feb. 3, 2022

(51) Int. Cl.

| | |
|---|---|
| ***H04S 7/00*** | (2006.01) |
| ***H04R 5/04*** | (2006.01) |
| ***H04R 3/00*** | (2006.01) |

(52) U.S. Cl.

CPC ............. *H04S 7/301* (2013.01); *H04R 3/005* (2013.01); *H04R 5/04* (2013.01)

(58) Field of Classification Search

CPC .......... H04S 7/301; H04S 7/302; H04S 7/305; H04S 2400/13; H04R 3/005; H04R 5/04; H04R 29/004

USPC ............................................ 381/56–60, 303

See application file for complete search history.

(56) References Cited

U.S. PATENT DOCUMENTS

| | | | | |
|---|---|---|---|---|
| 8,867,313 | B1 * | 10/2014 | Rivlin | G01S 11/14 367/118 |
| 9,559,656 | B2 * | 1/2017 | Tracey | H03G 3/32 |
| 2005/0013443 | A1 | 1/2005 | Marumoto et al. | |
| 2013/0103398 | A1 * | 4/2013 | Rauhala | G10L 15/20 381/56 |
| 2014/0161280 | A1 * | 6/2014 | Nackvi | H04S 7/305 381/98 |
| 2016/0330562 | A1 | 11/2016 | Crockett | |
| 2017/0006399 | A1 * | 1/2017 | Maziewski | H04R 29/004 |
| 2017/0374482 | A1 * | 12/2017 | McPherson | H04R 29/007 |
| 2019/0253824 | A1 | 8/2019 | Maher et al. | |
| 2022/0030360 | A1 * | 1/2022 | Nowak | H04R 19/04 |

OTHER PUBLICATIONS

MiniDSP, "Acoustic Measurement Tools: UMIK-1", Oct. 18, 2016, retrieved webpage from web.archive.org, "http://web.archive.org/web/20161018021403/https://www.minidsp.com/products/acoustic-measurement/umik-1", pp. 1-5 (Year: 2016).*

* cited by examiner

*Primary Examiner* — Daniel R Sellers

(74) *Attorney, Agent, or Firm* — John L. Rogitz; John M. Rogitz

(57) ABSTRACT

A remote commander (RC) for a TV or other entertainment system component has a microphone. A device can query the RC for its serial number, access the Internet with the serial number to look up characteristics of the microphone, and then knowing the characteristics, use the RC microphone to detect sound such as speaker test chirps to calibrate an audio system in a convenient and user-friendly manner while achieving the accuracy of calibration that can only be obtained by using a calibrated microphone system.

19 Claims, 9 Drawing Sheets

NETWORKED-SPEAKER BLOCK DIAGRAM

NETWORKED-SPEAKER BLOCK DIAGRAM

USING ENTERTAINMENT SYSTEM REMOTE COMMANDER FOR AUDIO SYSTEM CALIBRATION

FIELD

The present application relates generally to using remote controls for optimizing speaker listening experiences.

BACKGROUND

U.S. Pat. Nos. 9,288,597, 9,560,449, 9,866,986, 9,402,145, 9,369,801, 9,426,551, 9,826,332, 9,924,291, 9,693,169, 9,854,362, 9,924,286, and USPP 2018/115,825, owned by the present assignee and all incorporated herein by reference, teach techniques related to audio speaker systems and more particularly to wirelessly networked audio speaker systems. By wirelessly networking speakers in a system, flexibility is enhanced, because users can easily move speakers to locations in buildings as they desire and otherwise configure the audio system setup without the nuisance of wiring.

SUMMARY

As understood herein, audio system setup for room correction measurements can entail the use of microphones. This can be inconvenient as it requires setting up the microphone and taking the measurements.

Present principles eliminate that step by allowing the end user customer to use the microphone built into an entertainment system remote commander (also referred to herein as a "remote control").

Accordingly, an apparatus includes at least one processor programmed with instructions to retrieve from at least one remote commander (RC) an associated identification (ID). The RC includes at least one microphone and at least one transmitter to send commands to a TV and the audio signal from the microphone to a TV or audio system (soundbar, AVR). The instructions are executable to use the ID to retrieve at least one characteristic of the microphone and use the at least one characteristic to calibrate an audio system.

The apparatus may include the RC and/or the audio system. The processor may be implemented in a smart device configured to wirelessly communicate with the RC and/or by a component of the audio system configured to wirelessly communicate with the RC.

In example embodiments, the at least one characteristic includes one or more of frequency response, sensitivity, and phase response. If desired, the at least one characteristic can be determined after a microphone capsule associated with the at least one microphone is integrated into a mechanical assembly and coupled with a pre-amp and analog to digital converter (ADC) that are part of the microphone subsystem.

In some implementations, the at least one characteristic is an average characteristic derived from characteristics of plural RC microphone subsystems.

In another aspect, a method includes receiving, from a remote commander configured to wirelessly control an entertainment device, an identification (ID). The method includes using the ID, identifying at least one characteristic of at least one microphone of the RC, and using the characteristic to calibrate an audio system.

In another aspect, an apparatus includes at least one processor configured with instructions to identify, using an identification of a remote commander (RC) of an entertainment device, at least one characteristic of a microphone on the RC. The instructions are executable to calibrate an audio system using the microphone at least in part by compensating for the at least one characteristic in calibration signals generated by an audio system and represented in output of the microphone. In an example, compensating for the at least one characteristic may include flattening a response curve associated with the output of the microphone.

The details of the present application, both as to its structure and operation, can be best understood in reference to the accompanying drawings, in which like reference numerals refer to like parts, and in which:

DETAILED DESCRIPTION

Figure 1:
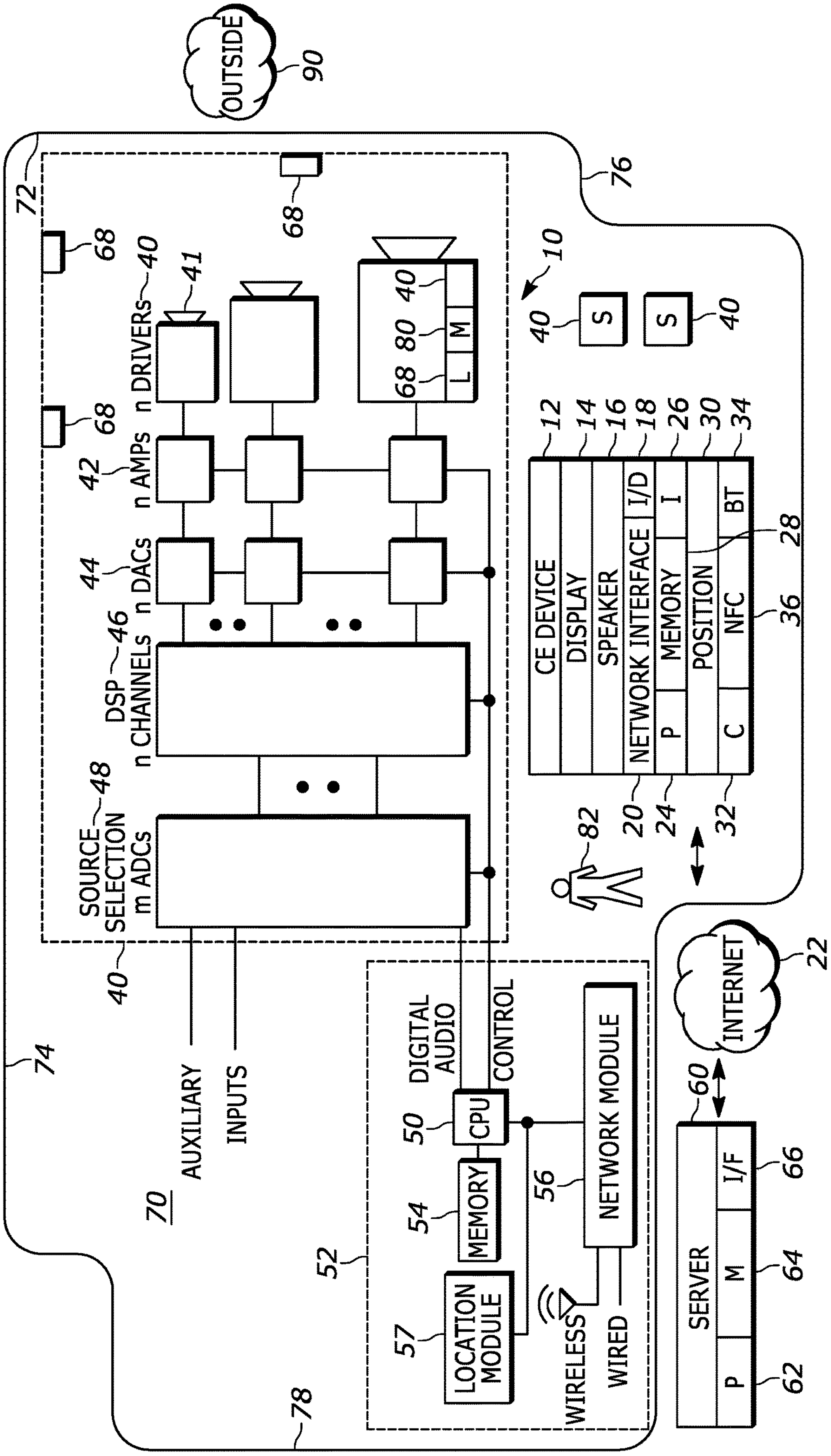
FIG. 1 is a block diagram of an example wireless audio speaker system.

This disclosure relates generally to computer ecosystems including aspects of multiple audio speaker ecosystems. A system herein may include server and client components, connected over a network such that data may be exchanged between the client and server components. The client components may include one or more computing devices that have audio speakers including audio speaker assemblies per se but also including speaker-bearing devices such as portable televisions (e.g. smart TVs, Internet-enabled TVs), portable computers such as laptops and tablet computers, and other mobile devices including smart phones and additional examples such as entertainment system remote controls (RC) discussed below. These client devices may operate with a variety of operating environments. For example, some of the client computers may employ, as examples, operating systems from Microsoft, or a Unix operating system, or operating systems produced by Apple Computer or Google.

These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example consumer electronics (CE) device 12. The CE device 12 may be, e.g., a computerized Internet enabled ("smart") telephone or tablet computer or a hand-held RC discussed in greater detail below. It is to be understood that the CE device 12 is configured to undertake present principles (e.g. communicate with other devices to undertake present principles, execute the logic described herein, and perform any other functions and/or operations described herein).

Accordingly, to undertake such principles the CE device 12 can be established by some or all of the components shown in FIG. 1. For example, the CE device 12 can include one or more touch-enabled displays 14, one or more speakers 16 for outputting audio in accordance with present principles, and at least one additional input device such as a microphone 18. The example CE device 12 may also include one or more network interfaces 20 for communication over at least one network 22 such as the Internet, an WAN, an LAN, etc. under control of one or more processors 24. It is to be understood that the processor 24 controls the CE device 12 to undertake present principles, including the other elements of the CE device 12 described herein such as controlling the display 14 to present images thereon and receiving input therefrom. Furthermore, note the network interface 20 may be a wired or wireless modem or router, or other appropriate interface such as a wireless telephony transceiver or Wi-Fi transceiver or infrared (IR) transmitter to send commands to an entertainment system component such as a TV.

In addition to the foregoing, the CE device 12 may also include one or more input ports 26 such as a USB port to physically connect to another CE device and/or a headphone port to connect headphones to the CE device 12 for presentation of audio from the CE device 12 to a user through the headphones. The CE device 12 may further include one or more computer memories 28 such as disk-based or solid-state storage that are not transitory signals. Also, in some embodiments, the CE device 12 can include a position or location receiver such as but not limited to a GPS receiver and/or altimeter 30 that is configured to receive geographic position information from at least one satellite and provide the information to the processor 24 and/or determine an altitude at which the CE device 12 is disposed in conjunction with the processor 24. However, it is to be understood that that another suitable position receiver other than a GPS receiver and/or altimeter may be used in accordance with present principles to determine the location of the CE device 12 in all three dimensions.

Continuing the description of the CE device 12, in some embodiments the CE device 12 may include one or more cameras 32 that may be a thermal imaging camera, a digital camera such as a webcam, and/or a camera integrated into the CE device 12 and controllable by the processor 24 to gather pictures/images and/or video in accordance with present principles. Also included on the CE device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the CE device 12 may include one or more motion sensors including an accelerometer, gyroscope, cyclometer, magnetic sensor, infrared (IR) motion sensors such as passive IR sensors, an optical sensor, a speed and/or cadence sensor, a gesture sensor (for sensing gesture command), etc.) providing input to the processor 24.

In some examples, the CE device 12 may function in connection with the below-described "master" or the CE device 12 itself may establish a "master". A "master" is used to control multiple ("n", wherein "n" is an integer greater than one) speakers 40 in respective speaker housings, each of can have multiple drivers 41, with each driver 41 receiving signals from a respective amplifier 42 over wired and/or wireless links to transduce the signal into sound (the details of only a single speaker shown in FIG. 1, it being understood that the other speakers 40 may be similarly constructed). Each amplifier 42 may receive over wired and/or wireless links an analog signal that has been converted from a digital signal by a respective standalone or integral (with the amplifier) digital to analog converter (DAC) 44. The DACs 44 may receive, over respective wired and/or wireless channels, digital signals from a digital signal processor (DSP) 46 or other processing circuit.

The DSP 46 may receive source selection signals over wired and/or wireless links from plural analog to digital converters (ADC) 48, which may in turn receive appropriate auxiliary signals and, from a control processor 50 of a master control device 52, digital audio signals over wired and/or wireless links. The control processor 50 may access a computer memory 54 such as any of those described above and may also access a network module 56 to permit wired and/or wireless communication with the Internet. The control processor 50 may also access a location module 57. The location module 57 may be implemented by a UWB module or it may be implemented using the Li-Fi principles or by other appropriate techniques including GPS. One or more of the speakers 40 may also have respective location modules attached or otherwise associated with them. As an example, the master device 52 may be implemented by an audio video (AV) receiver or by a digital pre-amp processor (pre-pro).

As shown in FIG. 1, the control processor 50 may also communicate with each of the ADCs 48, DSP 46, DACs 44, and amplifiers 42 over wired and/or wireless links. In any case, each speaker 40 can be separately addressed over a network from the other speakers.

More particularly, in some embodiments, each speaker 40 may be associated with a respective network address such as but not limited to a respective media access control (MAC) address. Thus, each speaker may be separately addressed over a network such as the Internet. Wired and/or wireless communication links may be established between the speakers 40/CPU 50, CE device 12, and server 60, with the CE device 12 and/or server 60 being thus able to address individual speakers, in some examples through the CPU 50 and/or through the DSP 46 and/or through individual processing units associated with each individual speaker 40, as may be mounted integrally in the same housing as each individual speaker 40.

The CE device 12 and/or control device 52 of each individual speaker train (speaker+amplifier+DAC+DSP, for instance) may communicate over wired and/or wireless links with the Internet 22 and through the Internet 22 with one or more network servers 60. Only a single server 60 is shown in FIG. 1. A server 60 may include at least one processor 62, at least one tangible computer readable storage medium 64 such as disk-based or solid-state storage, and at least one network interface 66 that, under control of the processor 62, allows for communication with the other devices of FIG. 1 over the network 22, and indeed may facilitate communication between servers and client devices in accordance with present principles. Note that the network interface 66 may be a wired or wireless modem or router, Wi-Fi transceiver, Li-Fi transceiver, or other appropriate interface such as, e.g., a wireless telephony transceiver.

Accordingly, in some embodiments the server 60 may be an Internet server, may include and perform "cloud" functions such that the devices of the system 10 may access a "cloud" environment via the server 60 in example embodiments. In a specific example, the server 60 downloads a software application to the master and/or the CE device 12 for control of the speakers 40 according to logic below. The master/CE device 12 in turn can receive certain information from the speakers 40, such as their location from a real time location system (RTLS) such as but not limited to GPS or Li-Fi or UWB or other technique, and/or the master/CE device 12 can receive input from the user indicating the locations of the speakers 40 as further disclosed below. Based on these inputs at least in part, the master/CE device 12 may execute the speaker optimization logic discussed below, or it may upload the inputs to a cloud server 60 for processing of the optimization algorithms and return of optimization outputs to the CE device 12 for presentation thereof on the CE device 12, and/or the cloud server 60 may establish speaker configurations automatically by directly communicating with the speakers 40 via their respective addresses, in some cases through the CE device 12. Note that if desired, each speaker 40 may include one or more respective one or more light emitting diode (LED) assemblies 68 implementing Li-Fi communication to establish short-range wireless communication among the networked speakers shown. Also, the remote control of the user, e.g., the CE device 12, may include one or more LED assemblies.

As shown, the speakers 40 are disposed in the enclosure 70 such as a room. For purposes of disclosure, the enclosure 70 has (with respect to the example orientation of the speakers shown in FIG. 1) a front wall 72, left and right-side walls 74, 76, and a rear wall 78. One or more listeners 82 may occupy the enclosure 70 to listen to audio from the speakers 40. One or microphones 80 may be arranged in the enclosure including on the CE device 12 when implemented as a RC for generating signals representative of sound in the enclosure 70, sending those signals via wired and/or wireless links to the CPU 50 and/or the CE device 12 and/or the server 60.

Because of the portability afforded by wireless configurations, one or more components of the system shown in FIG. 1, such as one or more speakers, may be moved outside the enclosure 70 an outside location 90, such as a patio. Principles described further below can automatically reconfigure speakers based on whether they are inside or outside.

Disclosure below may make determinations using sonic wave calculations, in which the acoustic waves frequencies (and their harmonics) from each speaker, given its role as a bass speaker, a treble speaker, a sub-woofer speaker, or other speaker characterized by having assigned to it a particular frequency band, are computationally modeled in the enclosure 70 and the locations of constructive and destructive wave interference determined based on where the speaker is and where the walls 72-78 are. As mentioned above, the computations may be executed, e.g., by the CE device 12 and/or by the cloud server 60 and/or master 52.

As an example, a speaker may emit a band of frequencies between 20 Hz and 30 Hz, and frequencies (with their harmonics) of 20 Hz, 25 Hz, and 30 Hz may be modeled to propagate in the enclosure 70 with constructive and destructive interference locations noted and recorded. The wave interference patterns of other speakers based on the modeled expected frequency assignations and the locations in the enclosure 70 of those other speakers may be similarly computationally modeled together to render an acoustic model for a particular speaker system physical layout in the enclosure 70 with a particular speaker frequency assignations. In some embodiments, reflection of sound waves from one or more of the walls may be accounted for in determining wave interference. In other embodiments reflection of sound waves from one or more of the walls may not be accounted for in determining wave interference. The acoustic model based on wave interference computations may furthermore account for particular speaker parameters such as but not limited to equalization (EQ). The parameters may also include delays, i.e., soundtrack delays between speakers, which result in respective wave propagation delays relative to the waves from other speakers, which delays may also be accounted for in the modeling. A soundtrack delay refers to the temporal delay between emitting, using respective speakers, parallel parts of the same soundtrack, which temporally shifts the waveform pattern of the corresponding speaker. The parameters can also include volume, which defines the amplitude of the waves from a particular speaker and thus the magnitude of constructive and destructive interferences in the waveform. Collectively, a combination of speaker location, frequency assignation, and parameters may be considered to be a "configuration". A configuration may be established to optimize, according to a desired, potentially empirically-determined standard of optimization, acoustic wave constructive and destructive interference for a particular location in the enclosure 70 given the locations of the walls and the various frequencies to be assigned to the various speakers. The particular location(s) may be the expected or actual location of one or more listener, and the EQs, frequency assignations, and delays of the various speakers may be further tailored to the desires or traits of specific individual listeners based on listener profiles.

Figure 2:
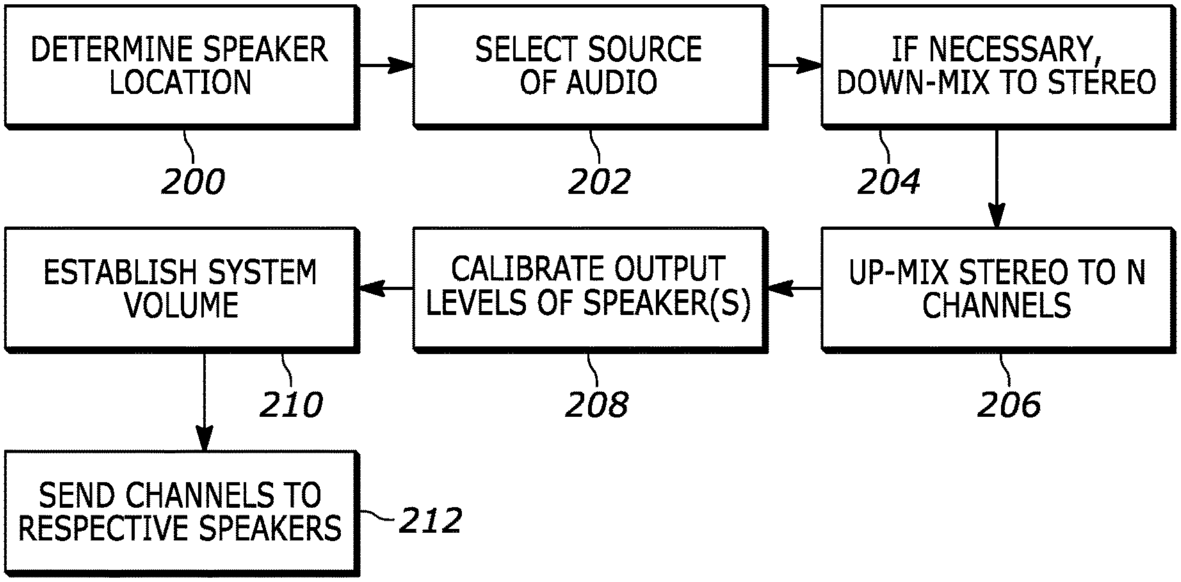
FIG. 2 is a flow chart of example overall logic pertaining to the centralized system in FIG. 1.

The configuration shown in FIG. 1 has a centralized control architecture in which the master device 52 or CE device 12 or other device functioning as a master renders two channel audio into as many channels are there are speakers in the system, providing each respective speaker with its channel. The rendering, which produces more channels than stereo and hence may be considered "up-mixing", may be executed using principles described in U.S. Pat. No. 10,616,684, incorporated herein by reference in relevant part. FIG. 2 describes the overall logic flow that may be implemented using the centralized architecture of FIG. 1, in which most if not all of the logic is executed by the master device.

The logic shown in FIG. 2 may be executed by one or more of the CPU 50, the CE device 12 processor 24, and the server 60 processor 62. The logic may be executed at application boot time when a user, e.g. by means of the CE device 12, launches a control application, which prompts the user to energize the speaker system to energize the speakers 40.

Commencing at block 200, the processor(s) of the master determines room dimension, the location of each speaker in the system, and number of speakers in the room, and the location and if desired identities of each listener in the room. This process is described further below. Moving to block 202, the master selects the source of audio to be played. This may be done responsive to user command input using, e.g., the device 12.

If the input audio is not two channel stereos, but instead is, e.g., seven channel audio plus a subwoofer channel (denoted "7.1 audio"), at block 204 the input audio may be downmixed to stereo (two channel). The down-mixing may be executed using principles described in the above-referenced patent. Then, proceeding to block 206 the stereo audio (whether received in stereo or down-mixed) can be up-mixed to render "N" channels, where "N" is the number of speaker drivers in the system. Audio can be rendered for each speaker driver based on the respective speaker location (i.e., perimeter, aerial, sub in the x, y, z domain). The up mixing can be based on the current speaker locations as will be explained further shortly.

Moving to block 208, the channel/speaker output levels are calibrated per description below, preferably based on primary listener location, and then at block 210 system volume is established based on, e.g., room dimensions, number, and location of speakers, etc. The user may adjust this volume. At block 212 the master sends the respective audio channels to the respective speakers.

Thus, it may now be appreciated that the speakers 40 do not have to be in a predefined configuration to support a specific audio configuration such as 5.1 or 7.1 and do not have to be disposed in the pre-defined locations of such audio configurations, because the input audio is down-mixed to stereo and then up-mixed into the appropriate number of channels for the actual locations and number of speakers.

Figure 3:
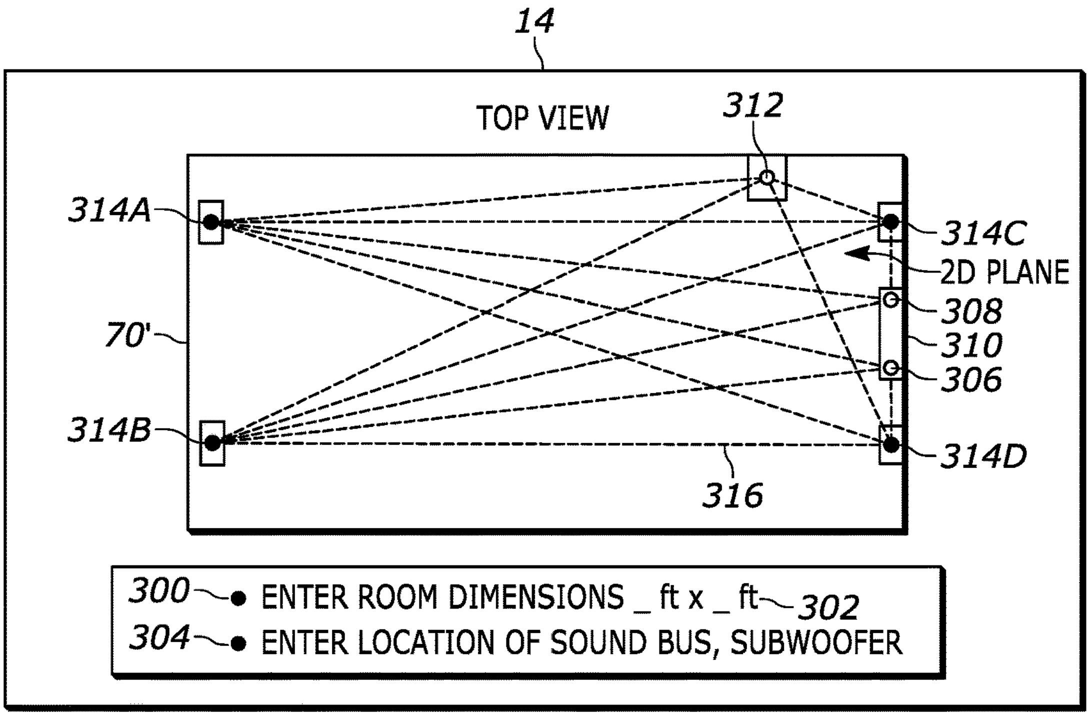
FIG. 3 is a screen shot of an example user interface (UI) that may be presented on a consumer electronics (CE) device to set up speaker location determination.

FIG. 3 illustrates an embodiment in which the dimensions of the enclosure 70 are manually entered by the user, it being understood that automatic means of effecting the same outcome are set forth further below.

Figure 4:
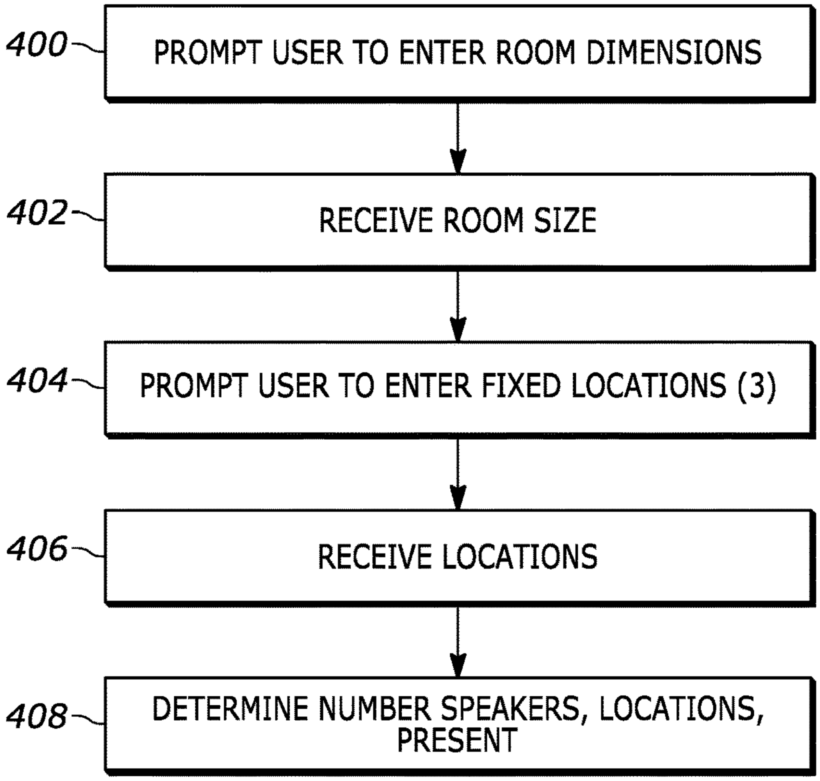
FIG. 4 is a flow chart of example logic for determining speaker locations in a room.

A user interface (UI) may be presented, e.g., on the display 14 of the CE device 12, pursuant to the logic in block 200 of FIG. 2, in the case in which speaker location determination is intended for two dimensions only (in the x-y, or horizontal, plane). FIG. 4 illustrates aspects of logic that may be used with FIG. 3. An application (e.g., via Android, iOS, or URL) can be provided to the customer for use on the CE device 12.

As shown at 300 in FIG. 3 and at block 400 in FIG. 4, the user can be prompted to enter the dimensions of the room 70, an outline 70' of which may be presented on the CE device as shown once the user has entered the dimensions. The dimensions may be entered alpha-numerically, e.g., "15 feet by 20 feet" as at 302 in FIG. 3 and/or by dragging and dropping the lines of an initial outline 70' to conform to the size and shape of the room 70. The application presenting the UI of FIG. 3 may provide a reference origin, e.g., the southwest corner of the room. The room size is received from the user input at block 402 of FIG. 4.

In other embodiments discussed further below, room size and shape can be determined automatically. This can be done by sending measurement waves (such as Li-Fi transmissions from the LEDs) from an appropriate transceiver on the CE device 12 and detecting returned reflections from the walls of the room 70, determining the distances between transmitted and received waves to be one half the time between transmission and reception times the speed of the relevant wave. Or, it may be executed using other principles such as imaging the walls and then using image recognition principles to convert the images into an electronic map of the room.

Moving to block 404, the user may be prompted as at 304 to enter onto the UI of FIG. 3 at least three fixed locations, in one example, the left and right ends 306, 308 of a sound bar or TV 310 and the location at which the user has disposed the audio system subwoofer 312. Four fixed locations are entered for 3D rendering determinations. Entry may be effected by touching the display 14 at the locations in the outline 70' corresponding to the requested components. In a Li-Fi implementation, each fixed location may be associated with a respective Li-Fi LED 68 shown in FIG. 1. The locations are received at block 406 in FIG. 4. The user may also directly input the fact that, for instance, the sound bar is against a wall, so that rendering calculations can ignore mathematically possible calculations in the region behind the wall.

Note that only speakers determined to be in the same room may be considered. Other speakers in other rooms can be ignored. When determining the speaker locations, it may first be decided if a 2D or 3D approach is to be used. This may be done by knowing how many known of fixed locations have been entered. Three known locations yield a 2D approach (all speakers are more or less residing in a single plane). Four known locations yield a 3D approach. Note further that the distance between the two fixed sound bar (or TV) locations may be known by the manufacturer and input to the processor automatically as soon as the user indicated a single location for the sound bar. In some embodiments, the subwoofer location can be input by the user by entering the distance from the sound bar to the subwoofer. Moreover, if a TV is used for two of the fixed locations, the TV may have two locators mounted on it with a predetermined distance between the locators stored in memory, similar to the sound bar. Yet again, standalone location markers such as LEDs or UWB tags can be placed within the room (e.g., at the corner of room, room boundary, and/or listening position) and the distance from each standalone marker to the master entered into the processor.

When communication is established among the speakers in the room 70, at block 408 in FIG. 4 the master device and/or CE device 12 and/or other device implements a location module according to the location determination references above, determining the number of speakers in the room 70 and their locations, and if desired presenting the speakers at the determined locations (along with the sound bar 310 and subwoofer 213) as shown at 314A-D in FIG. 3. The lines 316 shown in FIG. 3 illustrate communication among the speakers 310, 312, 314 and may or may not be presented in the UI of FIG. 3.

In an example "automatic" implementation, a component in the system such as the master device or CE device 12 originates two-way UWB or Li-Fi ranging (or using GPS modules on each speaker) or sonic. When ranging is used, range and direction to each speaker from the originating device are determined using triangulation and the distance-time-speed algorithm described above. If desired, multiple rounds of two-way ranging can be performed with the results averaged for greater accuracy.

The two-way ranging described above may be affected by causing the CE device 12 (or other device acting as a master for purposes of speaker location determination) to receive a poll message from an anchor point. The CE device 12 sends a response message to the poll message. These messages can convey the identifications associated with each transmitter. In this way, the number of speakers can be known.

The polling anchor point may wait a predetermined period known to the CE device 12 and then send a final poll message to the CE device 12, which can then, knowing the predetermined period from receipt of its response message that the anchor point waited and the speed of the signals, and the time the final message was received, determine the range to the anchor point.

While FIGS. 3 and 4 are directed to finding the locations of the speakers in two dimensions, their heights (elevations) in the room 70 may also be determined for a three-dimensional location output. The height of each speaker can be manually input by the user or determined using an altimeter associated with each speaker or determined by implementing a LED 68, e.g., the CE device 12 as three integrated circuits with respective LEDs distanced from each other by known distances, enabling triangulation in three dimensions. Other techniques for finding z-axis locations such as UWB, etc. may be used.

The primary listener location may be then determined according to discussion below. The number of speakers and their locations in the room are now known. Any speakers detected as above that lie outside the room may be ignored. A GUI may be presented on the CE device of the user showing the room and speakers therein and prompting the user to confirm the correctness of the determined locations and room dimensions.

Figure 5:
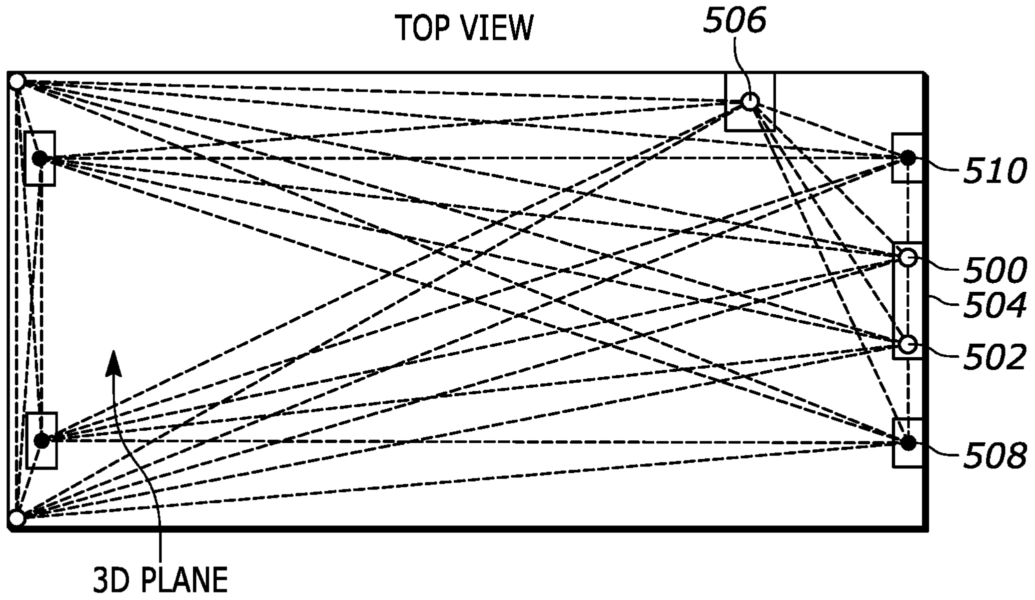
FIGS. 5-7 are additional screen shots of example UIs related to speaker location determination.
Figure 6:
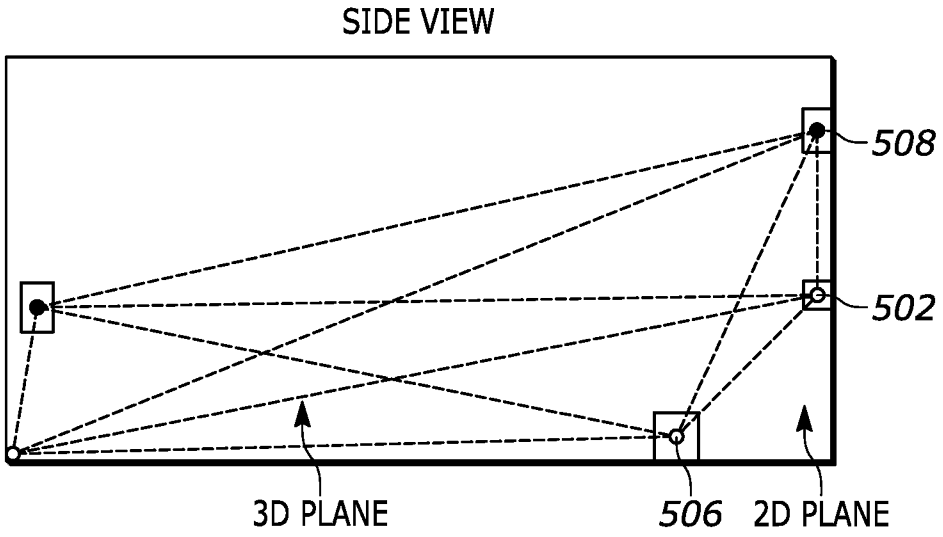

FIGS. 5 and 6 illustrate aspects of an implementation of the 3D location determination. These figures may be presented as UIs on the CE device 12. Four known locations may be provided to determine the location of each speaker in three dimensions. In the example shown in FIG. 5, the user has input the locations 500, 502 associated with a sound bar/TV 504 and the location of the subwoofer 506. The user has also identified (e.g., by touching the display 14 of the CE device 12 at the appropriate locations) two corners 508, 510 of the room 70, preferably corners in which locators such as LEDs 68 have been positioned. Determination of the number of speakers and locations in 3D using triangulation discussed above and the techniques described in the above-referenced location determination references is then made. Note that while FIGS. 5 and 6 respectively show a top view and a side view of the room 70 on the display 14 in two separate images, a single 3D image composite may be presented.

Figure 7:
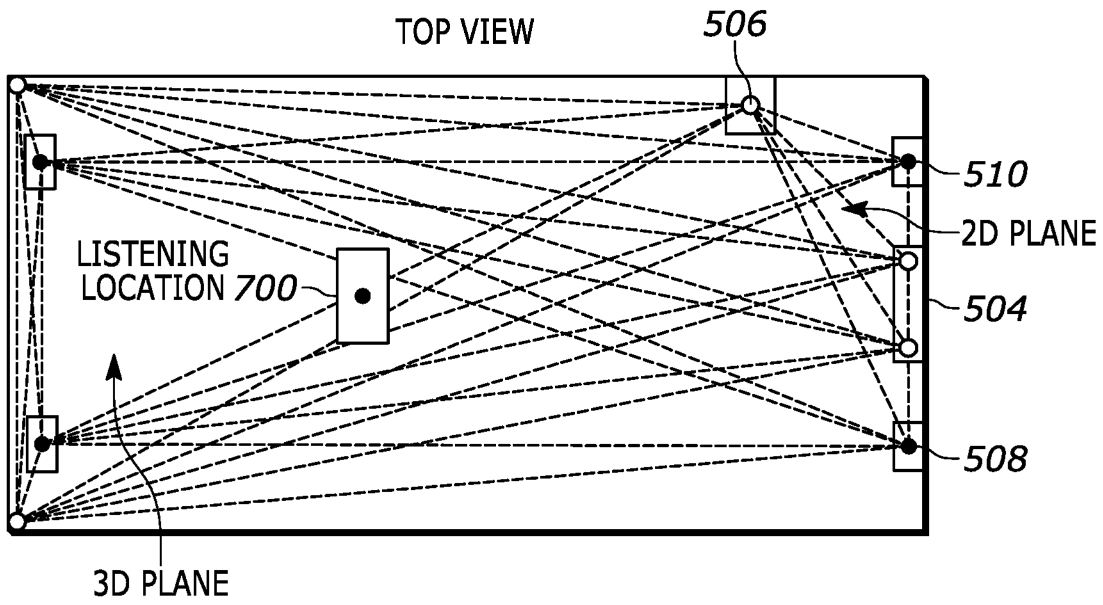

FIG. 7 illustrates yet another UI that can be presented on the CE device 12 in which the user has entered, at 700, the expected location of a listener in the room 700. Or, the location 700 can be automatically determined as described further below using transmissions. Yet again, for purposes of up-mixing according to the rendering references incorporated above, a default location may be assumed, e.g., the geometric center of the room 70, or alternatively about ⅔ of the distance from the front of the room (where the sound bar or TV is usually located) to the rear of the room.

Once the number and locations of the speakers are known, the up mixing at block 206 may be executed using the principles discussed in the above-referenced patent. Specifically, the stereo audio (either as received stereo or resulting from down-mixing of non-stereo input audio at block 204) is up-mixed to, as an example, N.M audio, wherein M=number of subwoofers (typically one) and N=number of speaker drivers other than the sub-woofer. As detailed in the rendering documents, the up-mixing uses the speaker locations in the room 70 to determine which of the "N" channels to assign to each of the respective N speaker drivers, with the subwoofer channel being always assigned to the subwoofer. The listener location 700 shown in FIG. 7 can be used to further refine channel delay, EQ, and volume based on the speaker characteristics (parameters) to optimize the sound for the listener location.

One or more measurement microphones, such as may be established by the microphones 80 in FIG. 1, may be used if available to further calibrate the channel characteristics.

This may be made based on information received from the individual speakers/CPU 50 indicating microphones are on the speakers, for example.

If measurement microphones are available, the user can be guided through a measurement routine. In one example, the user is guided to cause each individual speaker in the system to emit a test sound ("chirp") that the microphones 80 and/or microphone 18 of the CE device 12 detect and provide representative signals thereof to the processor or processors executing the logic, which, based on the test chirps, can adjust speaker parameters such as EQ, delays, and volume.

The example above uses a centralized master device to up-mix and render each of the "N" audio channels, sending those channels to the respective speakers. When wireless connections are used, and bandwidth is limited, a distributed architecture may be used, in which the same stereo audio from a master is sent to each speaker, and each speaker renders, from the stereo audio, its own respective channel. Details of this alternative architecture are set forth in U.S. Pat. No. 9,826,332, incorporated by reference in relevant part.

In determining distances using ranging, one or more measurement signals such as light beams may be transmitted, and reflections received. To determine distance the following equation may be used:

$$D=c(t_1-t_0)$$

where c=speed of light, $t_1$ is time of receipt, and $t_0$ is time of transmission.

It may then be assumed that for each receiver, the distance to the wall closest to that receiver a midpoint of a projected planar surface. The midpoints may be communicated to a determination processor (which may be implemented by any of the processors herein) which projects respective planes from each midpoint. The projected planar surfaces will intersect each other with the intersections defining the corners of the enclosure 70 and the portions of the projected planes within the corners defining the walls of the enclosure.

The above is but one simplified method for mapping the wall locations of the enclosure 70. More complex methods may be used. For example, the process above can be repeated multiple times to refine the wall locations. Additional reflections after time $t_1$ at each receiver may also be used to ascertain whether a receiver's initial reflection is indeed from a wall or from an intervening object. Or, the transmitting assembly may be mounted on a gimbal to send multiple transmissions at multiple orientations such that the reflections detected by the receivers at some orientations may be received sooner than reflections received at other orientations, with the further reflection being assumed to be a wall and the earlier reflection assumed to be from an intervening object between the receiver and wall. Instead of a gimbal to steer the transmitting assembly, a micro-electrical mechanical system (MEMS) may be used.

Yet again, in embodiments in which each location assembly knows its location and the locations of other assemblies by virtue of GPS information being communicated between the assemblies or by other means (e.g., manual location entry by an installer), the locations of the assemblies may be used in the computation of wall locations to ferret out false indications of wall locations arising from reflections from intervening objects. Yet again, it may be assumed, for the same purpose that each receiver is more or less at the same distance from its closest wall as the opposite receiver.

A combination of manual and automatic mapping may be used. For instance, a user may be presented with a UI such as those described above to indicate the locations of the walls of the enclosure, with subsequent reflections determined to have come from the walls based on the known locations of the LED assemblies being ignored and other reflections being inferred to be from intervening objects such as listeners or audio speakers. Similarly, the user may use a touch display to touch a presentation of an estimated model of the enclosure to indicate where audio speakers and/or listeners are, with reflections from those locations being ignored by the LED assemblies and other reflections inferred to be from the walls, thereby refining the map of the enclosure.

Note that when mapping, reflections indicating locations in the same flat plane, potentially satisfying a size criterion that discriminates between larger walls and smaller rectangular objects, may be mapped as walls of the enclosure. That is, feature recognition may be used to recognize that a series of reflections at a given receiver or receivers all lie in the same plane, and that the plane is sufficiently large to be inferred to be a wall. In addition, or alternatively, the feature recognition may be based on the type of reflection received. For example, it may be assumed that a strong reflection (higher amplitude) comes from a hard speaker surface, whereas a less strong reflection comes from a matte-painted wall. Other feature vectors may be used. Return signal characteristics may be, as discussed above, an exceptionally high amplitude as may be reflected by reflectors or tags engaged with the audio speakers. In contrast other points of reflection with a second type of return signal characteristic may be mapped as human listener locations. The second type of return signal characteristic may be a relatively low amplitude reflection signal as may be produced by a surface such as human skin that is softer than an audio speaker or a wall.

Figure 8:
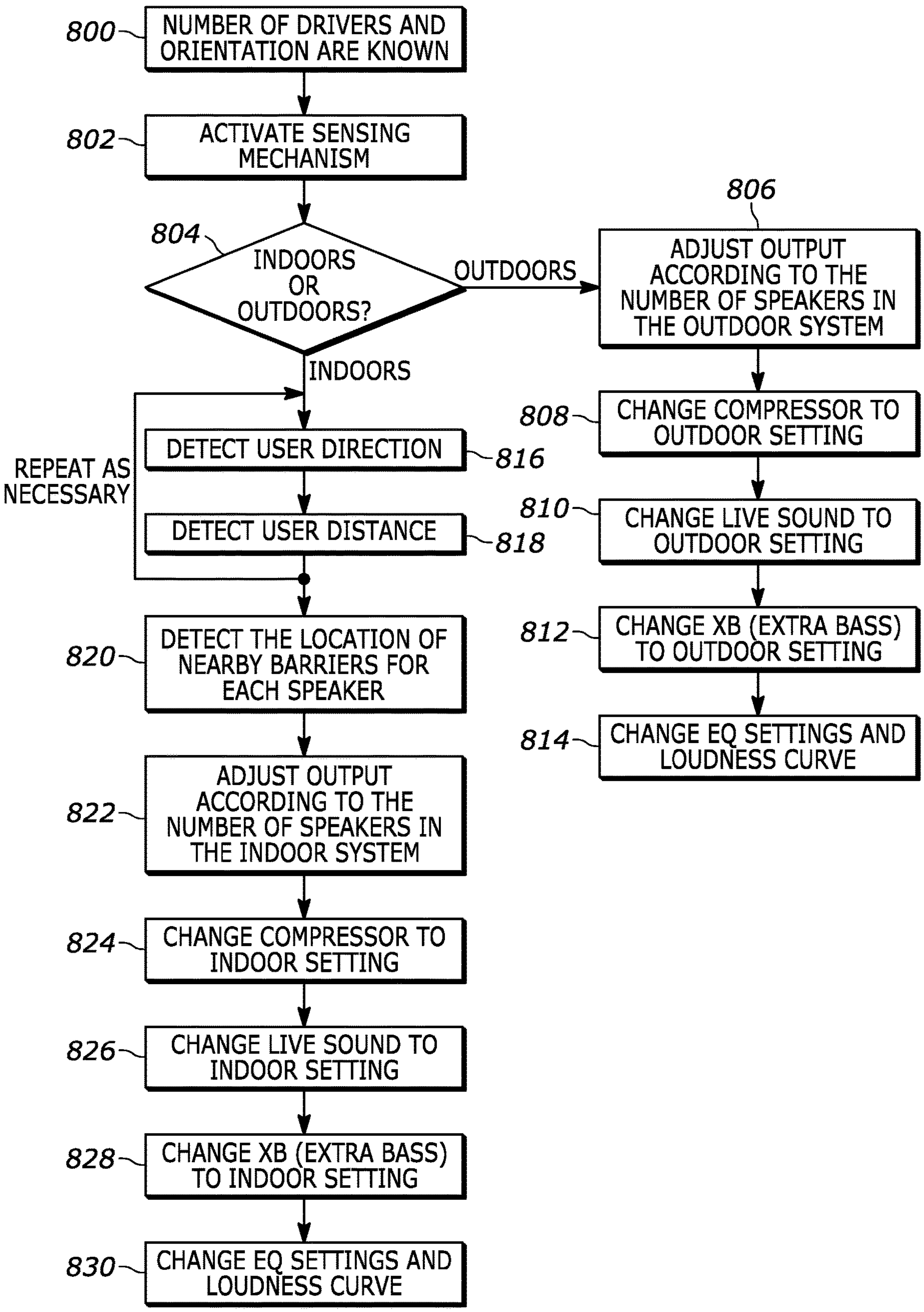
FIG. 8 is a flow chart of example logic for establishing audio speaker system configurations based on whether speakers are indoors or have been moved outdoors.

FIG. 8 illustrates logic for establishing audio configurations in a speaker system depending on whether the system is indoors or outdoors. Commencing at block 800, the number of speaker drivers and their orientations (i.e., axis of sound cone projected by the associated speaker, in 3D if desired) are identified. This may be done using any of the techniques described above, e.g., by receiving user input of this information during setup or using any of the automatic methods described herein. Note that some speakers may have multiple drivers for a greater than stereo effect. Speaker driver configuration is discussed further below.

Moving to block 802, a sensing mechanism is monitored, if need be by first activating it, for determining whether part or all of the speaker system is indoors or outdoors. Activation may be initiated by, e.g., tapping or double tapping an audio system component such as any described herein or moving, if desired in a certain way, an audio system component such as any described herein, with such movement being sensed and correlated to "activate indoor/outdoor determination".

In one example, activation can entail activating a microphone such as any of the microphones described herein to receive a voice command indicating "indoor" or "outdoor". In another example this can entail activating a microphone such as any of the microphones described herein to receive a voice command indicating that any of the processors described herein is to automatically determine whether the audio system is indoors or outdoors.

A number of techniques may be used to do this. For example, signals from one or more light sensors on or near respective speakers can be received, indicating illumination levels correlated with indoors (typically lower levels) or outdoors (typically higher levels for daytime and lower than indoors for night). Or, signals from one or more microphones on or near respective speakers can be received, digitized, and compared against a database of audio fingerprints to determine whether sounds are being received such as bird chirps that are correlated to outdoors or cooking sounds normally correlated to indoors, etc. As further examples, signals from one or more moisture sensors on or near respective speakers can be received, with relatively higher moisture levels indicating outdoors and relatively lower moisture levels indicating indoors. Still further, signals from one or more cameras on or near respective speakers can be received, digitized, and using image recognition compared against a database of images that correlates some images (such as of stars, trees, etc.) to outdoors and other images (such as walls, kitchen appliances, etc.) to indoors.

Decision diamond 804 is used to indicate that if "outdoors" is determined, logic advances to block 806 et seq. to automatically establish audio settings for the system appropriate for outdoor operation, whereas if "indoors" is determined, logic advances to block 816 et seq. to establish audio settings for the system appropriate for indoor operation.

At block 806, audio channels are established according to how many speakers are in the outdoor environment. If only a single speaker is outdoors, input audio (e.g., stereo) is converted to mono and played on the sole outdoor speaker. If two speakers are outdoors, stereo is output for play of one channel on one of the speakers and the other channel on the other speaker. If three speakers are outdoors, input audio, if stereo, for example, is converted to left, center, and right channels for play of the three channels on the three respective speakers. Similarly, if four speakers are outdoors, input audio, if stereo, for example, is converted to four channels (for example, left front, right front, left rear, right rear) for play of the four channels on the four respective speakers. In general, input stereo may be up-converted to N-channel audio for play on N outdoors speakers.

Moving to block 808, dynamic audio compression (in some examples, implemented by an audio compressor) is set to an outdoor value. Audio compression is a signal processing operation that reduces the volume of loud sounds or amplifies quiet sounds thus reducing or compressing an audio signal's dynamic range. For outdoor operation, low compression relative to the value that would be set for indoor operation may be used because ambient noise out of doors may typically be higher than quieter ambient atmosphere indoors. Other settings heuristics may be used.

Proceeding to block 810, "live sound", the amount of ambient noise that is processed relative to the primary demanded audio, is set to a value appropriate for outdoor operation. An example value would be a setting to process less ambient noise when outdoors than when in an indoor environment. At block 812 an extra base audio setting may be established at a value appropriate for outdoor operation. For example, more extra bass (higher value) may be established for outdoor operation than would be established for indoor operation. Likewise, at block 814 an equalization (EQ) setting value and loudness curve may be established that is more appropriate for outdoor operation. As an example, an EQ value that results in more bass compared to treble than an EQ value that results in relatively less bass compared to treble may be established for outdoor operation, with an EQ value that results in relatively less bass compared to treble may be established for indoor operation. A loudness curve more appropriate for outdoor operation also may be established.

On the other hand, when indoor operation is identified at decision diamond 804, the logic may move to block 816 to determine the direction from a user (listener) to the audio system or a speaker thereof (such as the center channel speaker). At block 818 the distance between the user (listener) and system or audio speaker may also be determined. Locations of nearby barriers such as walls may be determined at block 820, if desired for each indoor speaker.

Blocks 822-830 are analogous to blocks 806-814 described above, except that indoor setting values are established in blocks 822-830. Thus, at block 822 audio channels are established according to how many speakers are in the indoor environment. Moving to block 824, dynamic audio compression (in some examples, implemented by an audio compressor) is set to an indoor value. Proceeding to block 826, "live sound" is set to a value appropriate for indoor operation. At block 828 an extra base audio setting may be established at a value appropriate for indoor operation. For example, less extra bass (lower value) may be established for indoor operation than would be established for outdoor operation. Likewise, at block 830 an equalization (EQ) setting value and loudness curve may be established that are more appropriate for indoor operation.

Figure 9:
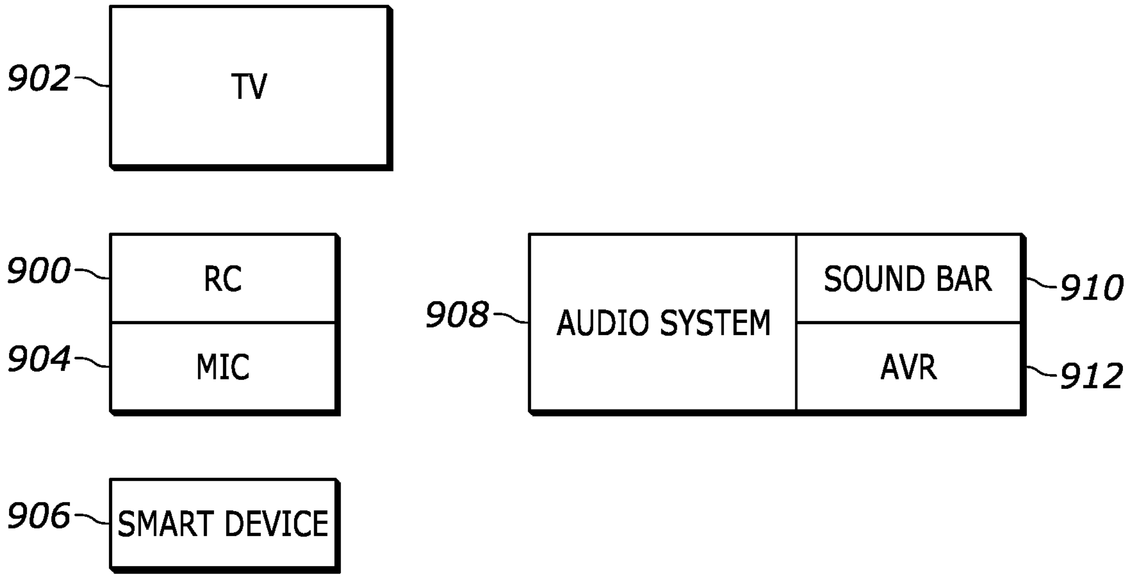
FIG. 9 illustrates an example audio system calibration assembly that include a remote commander for a TV and having a microphone in the RC.

FIG. 9 illustrates further. A remote commander 900 that may implement any of the appropriate components in, for instance, FIG. 1 can be used to send wireless signals such as IR signals to an entertainment system component such as a TV 902. The RC 900 is a hand-holdable lightweight device that may incorporate a microphone 904, which includes a sound pressure-to-electrical transducer sometimes called a "microphone capsule". The transducer typically is characterized by unique characteristics, namely, frequency response, sensitivity, and phase response. Of those, frequency response is the most important to the calibration accuracy. Once the microphone capsule is integrated into a mechanical assembly and coupled with a pre-amp and analog to digital converter (ADC) that are part of the microphone 904, these characteristics are altered to some extent. For the best accuracy, the final RC assembly is characterized by measuring the output of the microphone 904 at the factory during manufacture as described further below, and it is this characterization that preferably is reflected in the file associated with the microphone.

Once vended, the RC 900 may be used to control the TV 902 and to communicate with a smart device 906 such as but not limited to a mobile telephone for calibrating speakers in an audio system 908 that may incorporate any of the appropriate components shown in FIG. 1. The audio system 908 may include, among other components, a sound bar 910 and audio video recorder (AVR) 912.

Figure 10:
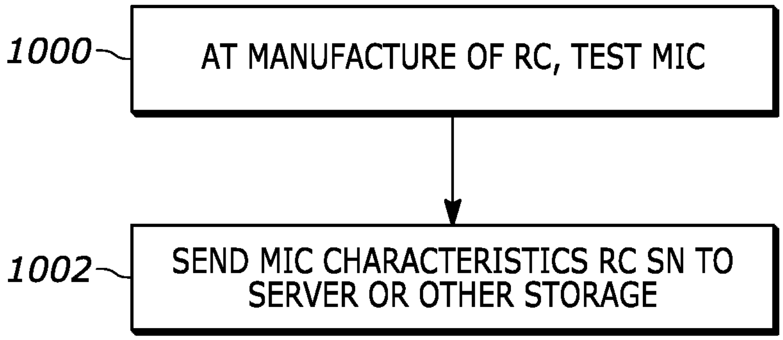
FIG. 10 illustrates example manufacturing logic in example flow chart format.

FIG. 10 illustrates logic conducted by the manufacturer of the RC 900. The microphone 900 is tested at block 1000 by measuring its output response to a known sound. This test information, which indicates the characteristics of the microphone 904, is recorded in a database along with the serial number of the RC 900 at block 1002, such as by sending this information to a network server or other device with storage. The test information may be formatted as a file that includes frequencies and corresponding gain offset values. Note that in addition to or in lieu of server storage, the microphone characteristic file can be stored in memory of the RC 900 or sent directly to the sound bar 910 or AV 912 or smart device 906.

Figure 11:
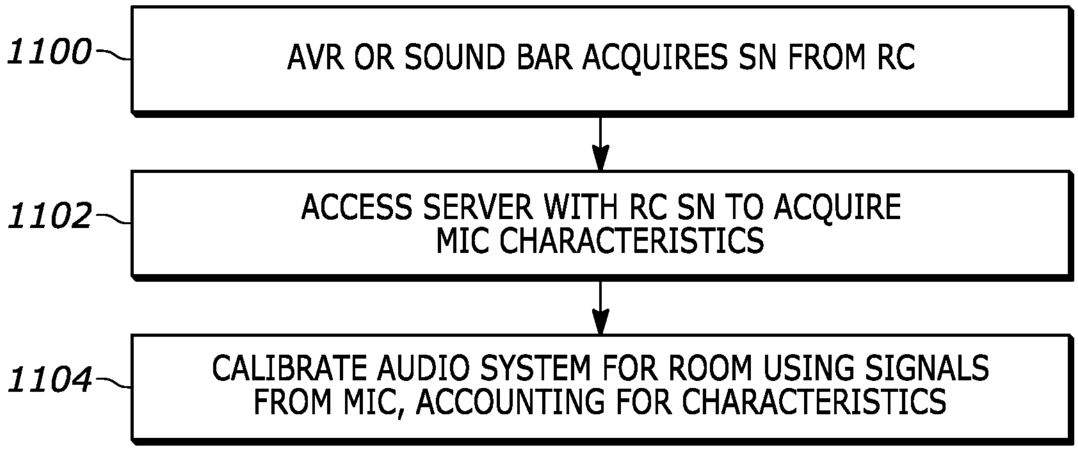
FIG. 11 illustrates example calibration logic in example flow chart format.

FIG. 11 shows that subsequently, after vending the RC 900 to an end user, the end user may employ the RC 900 to calibrate the audio system/enclosure in which the system is located, in one example, to calibrate the audio system 908 which may be located in the enclosure 70 shown in FIG. 1. Commencing at block 1100, the AVR 912 or sound bar 910 for example can acquire an identification of the RC such as the RC serial number from the RC 900 using wireless signaling such as Wi-Fi or Bluetooth. Moving to block 1102, using the RC SN, the AVR 912 or sound bar 910 can acquire the characteristics of the microphone 904 from a server or other storage. Once the microphone characteristics are acquired, at block 1104 the audio system 908 is calibrated for the enclosure 70 it is situated in. For example, speaker settings in the audio system 908 may be adjusted using the microphone characteristics to flatten the response curve of the microphone 904 to test sounds from one or more speakers.

The sounds from the speakers can include chirps, log sine sweeps, and impulses, and can be measured more accurately by a microphone system that has been calibrated and/or has known characteristics.

Without knowing the microphone characteristics, the transfer function between the acoustic input and the electrical output of the microphone to the calibration processor is unknown. The characteristics of the microphone (which can further include the shape, size, distance to, and the material of the opening that allows sound to reach the microphone capsule) imparts its own coloration on the signal. "Coloration" refers to resonance(s) which can be measured as frequency response and phase response changes. So, by knowing the microphone characteristics, their combined coloration effect can be compensated for to more accurately model the test signals used for calibration.

For example, a first microphone may impart a 3 dB dip in amplitude centered at 1 kHz but extending from 800 Hz to 1200 Hz. When this microphone is used to calibrate the audio system, then the audio system will include an EQ boost at 1 kHz to compensate for the dip in measured response. The problem is that the dip in response does not exist in the playback system, only in the measurement system. This makes the calibration inaccurate and the resulting tonal balance will be compromised. Similarly, a second microphone might impart a 4 dB peak in amplitude at 3 kHz, which would result in a different tonal balance issue if used to calibrate the system.

With a calibrated microphone system (or at least characterized and a known average used) this problem is reduced if not eliminated, because the "coloration" imparted by the calibration microphone can be canceled out.

Indeed in some embodiments, instead of using the actual characteristic file from the microphone 904 of the RC 900, the characteristics of plural RC microphones may be measured and averaged by measuring and generating calibration files for each microphone, then averaging them and possibly weighting the average or even discarding outliers. Though less than ideal, it would still provide good results in most cases.

Figure 12:
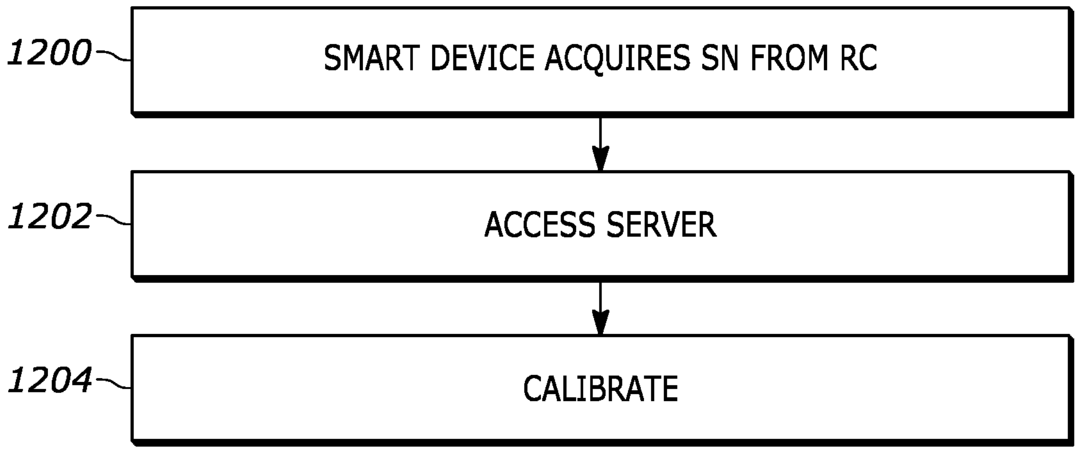
FIG. 12 illustrates alternate example calibration logic in example flow chart format.

FIG. 12 illustrates that in an alternative embodiment, the smart device 906 is used to perform the calibration. Commencing at block 1200, the smart device 906 can acquire the RC serial number from the RC 900 using wireless signaling such as Wi-Fi or Bluetooth. Moving to block 1102, using the RC SN, the smart device 906 can acquire the characteristics of the microphone 904 from a server or other storage. Once the microphone characteristics are acquired, at block 1104 the audio system 908 is calibrated for the enclosure 70 it is situated in.

It may now be appreciated that the end user customer can simply place the RC 900 in the intended listener location in the enclosure 70 and start the calibration program. This aids in establishing a personal calibration to room correction systems, enhancing, and allowing further customization of the sound. Present principles also make the audio system calibration setup for the enclosure 70 more user friendly and saves time, promoting more widespread adoption.

Figure 13:
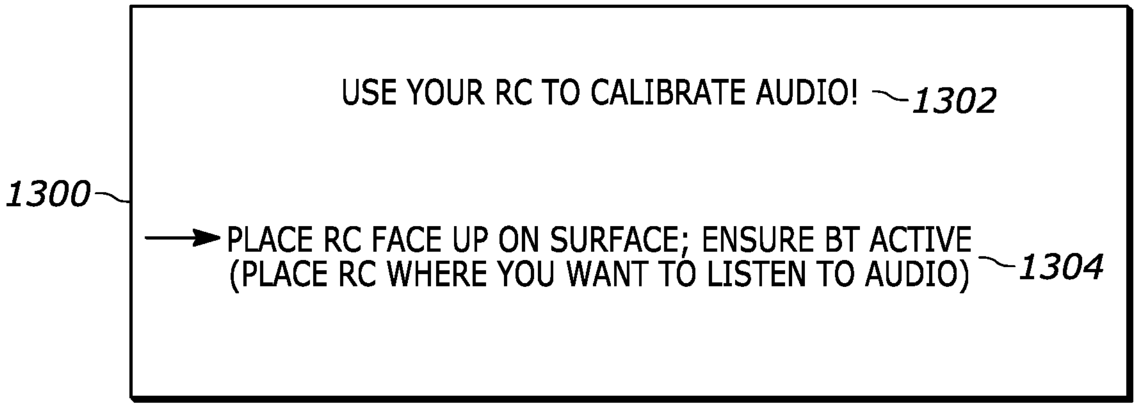
FIG. 13 represents a screen shot of a user interface (UI) that may be audibly or visibly presented on any device herein such as the smart device shown in FIG. 9.

FIG. 13 illustrates. FIG. 13 represents a screen shot of a user interface (UI) that may be audibly or visibly presented on any device herein such as a display 1300 of the smart device 906 shown in FIG. 9. A prompt 1302 may be presented to alert the user that the RC 900 can be used to calibrate the audio system in the user's home. An advisory 1304 may be presented to place the RC in a particular orientation tailored to the location of the microphone on the RC housing (in the example shown, face up on a surface). The advisory 1304 may also indicate to ensure that wireless communication for the RC is enabled and indicate where in the room to place the RC, in the example shown, at the intended location of a listener of the audio system.

While particular techniques are herein shown and described in detail, it is to be understood that the subject matter which is encompassed by the present invention is limited only by the claims.

What is claimed is:

1. An apparatus comprising:
at least one processor programmed with instructions to:
retrieve, for at least one remote commander (RC) comprising at least one microphone and at least one transmitter to send commands to a TV or audio system at least one characteristic of the microphone; and
use the at least one characteristic to calibrate an audio system, wherein the at least one characteristic is an average characteristic derived from characteristics of plural microphones of respective RCs with at least one outlier characteristic not being used.

2. The apparatus of claim 1, comprising the RC.

3. The apparatus of claim 1, comprising the audio system.

4. The apparatus of claim 1, wherein the processor is implemented in a smart device configured to wirelessly communicate with the RC.

5. The apparatus of claim 1, wherein the processor is implemented in a component of the audio system configured to wirelessly communicate with the RC.

6. The apparatus of claim 1, wherein the at least one characteristic comprises frequency response.

7. The apparatus of claim 1, wherein the at least one characteristic comprises sensitivity.

8. The apparatus of claim 1, wherein the at least one characteristic comprises phase response.

9. The apparatus of claim 1, wherein the at least one characteristic is determined after a microphone capsule associated with the at least one microphone is integrated into a mechanical assembly and coupled with a pre-amp and analog to digital converter (ADC) that are part of the microphone.

10. The apparatus of claim 1, wherein the instructions are executable to:
retrieve, for from the at least one RC, an associated identification (ID); and
use the ID to retrieve the at least one characteristic of the microphone and at least one gain offset corresponding to the characteristic.

11. A method, comprising:
receiving from a remote commander (RC) configured to wirelessly control an entertainment device an identification (ID);
using the ID, identifying at least one characteristic of at least one microphone of the RC; and using the at least one characteristic to calibrate an audio system at least in part by flattening a response curve of the microphone of the RC, wherein the at least one characteristic comprises an average characteristic derived from characteristics of plural microphones in respective RCs with outlier characteristics not being used in the average characteristic.

12. The method of claim 11, wherein the method is implemented by a smart device configured to wirelessly communicate with the RC.

13. The method of claim 11, wherein the method is implemented by a component of the audio system configured to wirelessly communicate with the RC.

14. The method of claim 11, wherein the at least one characteristic comprises frequency response.

15. The method of claim 11, wherein the at least one characteristic comprises sensitivity.

16. The method of claim 11, wherein the at least one characteristic comprises phase response.

17. The method of claim 11, wherein the at least one characteristic is determined after a microphone capsule associated with the at least one microphone is integrated into a mechanical assembly and coupled with a pre-amp and analog to digital converter (ADC) that are part of the microphone.

18. An apparatus comprising:

at least one processor configured with instructions to:

identify at least one characteristic of a microphone on a remote commander (RC); and calibrate an audio system using the microphone at least in part by compensating for the at least one characteristic, wherein the at least one characteristic comprises an average characteristic derived from characteristics of plural microphones in respective RCs with outlier characteristics not being used in the average characteristic.

19. The apparatus of claim 18, wherein compensating for the at least one characteristic comprises flattening a response curve associated with the output of the microphone.

* * * * *